United States Patent
Novik et al.

(10) Patent No.: US 7,275,250 B1
(45) Date of Patent: Sep. 25, 2007

(54) METHOD AND APPARATUS FOR CORRELATING EVENTS

(75) Inventors: Lev Novik, Bellevue, WA (US); Patrick R. Kenny, Redmond, WA (US); Alexander E. Nosov, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 988 days.

(21) Appl. No.: 09/847,534

(22) Filed: May 1, 2001

(51) Int. Cl.
G06F 9/54 (2006.01)
G06F 9/00 (2006.01)

(52) U.S. Cl. .................. 719/318; 707/103 R; 719/315

(58) Field of Classification Search ................ 709/315, 709/316, 318; 719/315, 316, 318, 310–332; 718/318, 1, 100–108; 717/100–178; 707/103
See application file for complete search history.

(56) References Cited

U.S. PATENT DOCUMENTS

| | | | |
|---|---|---|---|
| 5,504,896 A * | 4/1996 | Schell et al. ................ 725/131 |
| 5,555,415 A * | 9/1996 | Allen ......................... 709/318 |
| 5,632,035 A | 5/1997 | Goodwin |
| 5,715,460 A | 2/1998 | Acker et al. |
| 5,724,589 A | 3/1998 | Wold |
| 5,761,502 A * | 6/1998 | Jacobs ..................... 707/103 R |
| 5,822,583 A * | 10/1998 | Tabuchi ....................... 718/100 |
| 5,838,918 A | 11/1998 | Prager et al. |
| 5,864,700 A | 1/1999 | Barton et al. |
| 5,913,043 A * | 6/1999 | Carter et al. ................ 710/100 |
| 5,930,482 A * | 7/1999 | Carter et al. ................ 710/100 |
| 5,958,035 A * | 9/1999 | Carter et al. ................ 710/306 |
| 6,032,152 A | 2/2000 | Pearson |
| 6,041,306 A * | 3/2000 | Du et al. ........................ 705/8 |
| 6,138,171 A * | 10/2000 | Walker ....................... 709/318 |
| 6,195,794 B1 | 2/2001 | Buxton |
| 6,260,186 B1 * | 7/2001 | James ......................... 717/104 |
| 6,275,957 B1 | 8/2001 | Novik et al. |
| 6,307,546 B1 * | 10/2001 | Wickham et al. ............ 715/771 |
| 6,336,139 B1 * | 1/2002 | Feridun et al. .............. 709/224 |
| 6,405,368 B1 | 6/2002 | Freyburger |
| 6,598,225 B1 * | 7/2003 | Curtis et al. ................. 717/175 |
| 6,601,193 B1 * | 7/2003 | Liebau ......................... 714/39 |
| 6,675,228 B1 * | 1/2004 | Bahrs et al. ................. 719/318 |
| 6,751,753 B2 * | 6/2004 | Nguyen et al. ............... 714/39 |
| 6,760,905 B1 | 7/2004 | Hostetter et al. |
| 6,826,761 B1 * | 11/2004 | Damon et al. .............. 719/328 |

(Continued)

OTHER PUBLICATIONS

Jaworski, Jamie. "Java Developer' Guide." Chapter 3, Using the Java Developer'Kit. 1996, pp. 26-42.*

(Continued)

Primary Examiner—Lewis A. Bullock, Jr.

(57) ABSTRACT

A correlation system receives multiple events and multiple data elements. The multiple events and data elements are applied to a correlation function which is implemented as a state machine. A specific event is generated if the correlation function is satisfied by the multiple events and the multiple data elements. Additional events and data elements are received if the correlation function is not satisfied by the original events and data elements. The system allows for the identification of a schema for creating state machines that correlate events and/or data. An instance of a particular state machine is created and transitions for the particular state machine are defined by subscribing to one or more events. An update consumer is applied to the particular state machine to update the state of the particular state machine.

37 Claims, 8 Drawing Sheets

U.S. PATENT DOCUMENTS 6,829,771 B1 * 12/2004 Bahrs et al. ............... 719/318
6,889,373 B2    5/2005  Fukase et al.
2002/0040409 A1 * 4/2002 Matena et al. ............. 709/315

OTHER PUBLICATIONS

Merriam-webster, Incorporated. "Merriam-Webster's Collegiate Dictionary." Tenth edition. 1997, p. 1044.*

Van Gurp, Jilles et al. "On the Implementation of Finite State Machines". Proceedings of the IASTED International Conference, Oct. 3-8, 1999.*

Bergmann, Ralph et al. "Integrating General Knowledge with Object-Oriented Case Representation and Reasoning." 1996.*

Gamble, R.F. et al. "Rule-based systems formalized within a software architectural style." Knowledge-Based Systems, 1999.*

Pirahesh, Hamid et al. "A Rule Engine for Query Transformation in Starburst and IBM DB2 C/S DBMS." IEEE. 1997.*

"Composite events for network event correlation", Liu et al., Integrated Network Management VI, Proceedings of the Sixth IFIP/IEEE International Symposium on Integrated Network Management, May 24-28, 1999, pp. 247-260.

"High speed and robust event correlation", Yemini et al., IEEE Communications Magazine, May 1996, vol. 34, No. 5, pp. 82-90.

"A rule-based event manager for the Tivoli/Enterprise console", Bescos et al., Practical Application of PROLOG, Proceedings of the Third International Conference on the Practical Application of Prolog, Apr. 3-6, 1995, pp. 43-51.

"GRACE: building next generation event correlation services", Jakobson et al., Proceedings of Network Operations and Management Symposium, Apr. 10-14, 2000, pp. 701-714.

"A framework for distributed event correlation", Albaghdadi et al., Proceedings of the Seventeenth IASTED International Conference on Applied Informatics, Feb. 15-18, 1999, pp. 467-470.

"A proposal of event correlation for distributed network fault management and its evaluation", Kato et al., IEICE Transactions on Communications, Jun. 1999, vol. E82-B, No. 6, pp. 859-867.

Abstract for "A study on distributed network management with event correlation", Ika, T., Record of Electrical and Communication Engineering Conversazione Tohoku University, Aug. 1998, vol. 67, No. 1, pp. 458-459.

"MSFT_TemplateBuilder", Mar. 2005, http://msdn.microsoft.com/library/default.asp?url=/library/en-us/wmisdk/wmi/msft_templatebuilder.asp.

"Template Definition Language (TDL)", Apr. 2000, http://xml.coverpage.org/tdl.html.

D. Batory et al. "Building Product-Lines with Mixin-Layers", 1999, pp. (5), http://citeseer.ist.psu.edu/batory99building.html.

G. Hedin et al., "On the Role of Language Construct of Framework Design", ACM, 2000, pp. (5).

G. McCluskey, "Template Instantiation for C++", ACM, 1992, pp. 47-56.

Google Groups, "Can a template class have a nested template class?" (2001), "Serializabel anonymous inner classes?" (1999).

IBM TDB, "Dynamic Template Replacement Capability in Officeversion/2", 1991, pp. 22-23.

P. Eugster et al., "On Objects and Events", ACM, 2001, pp. 254-269.

Sun Microsystems, Inc., Inner Classes Specification, Feb. 1997, http://sunsite.tus.ac.jp/java/docs/jdk1.1/innerclasses.pdf.

Y. Smaragdakis et al, "Mixin-Based Programming in C++", 2000, pp. (15). http://citeseer.ist.psu.edu/smaragdakis00mixinbased.html.

* cited by examiner

METHOD AND APPARATUS FOR CORRELATING EVENTS

TECHNICAL FIELD

The present invention relates to computing systems and, more particularly, to the correlation of various events generated throughout a computing environment.

BACKGROUND

Computer systems, such as servers and desktop personal computers, are expected to operate without constant monitoring. These computer systems typically perform various tasks without the user's knowledge. When performing these tasks, the computer system often encounters events that require a particular action (such as logging the event, generating an alert for a particular system or application, or performing an action in response to the event). Various mechanisms are available to handle these events.

A computing enterprise typically includes one or more networks, services, and systems that exchange data and other information with one another. The enterprise may include one or more security mechanisms to safeguard data and authenticate users and may utilize one or more different data transmission protocols. At any particular time, one or more networks, services or systems may be down (e.g., powered down or disconnected from one or more networks). Networks, services or systems can be down for scheduled maintenance, upgrades, overload or failure. Application programs attempting to obtain event data must contend with the various networks, services, and systems in the enterprise when they are down. Additionally, application programs must contend with the security and network topology limitations of the enterprise as well as the various protocols used in the enterprise.

Operating system components, services, and applications generate a variety of different events. A particular component or application may request to be informed of a particular event (e.g., when a server crashes or when a user logs on to the system). Other components or applications may want to be notified when a particular series of events occur within a particular time period. For example, a network administrator may want to know when a server crashes within three seconds of a user logging into the system. Server crashes alone may be relatively common and user logins may also be common such that the network administrator is not particularly interested in either event by itself. However, when these two events occur within a few seconds of one another, there may be a relationship between the two events (e.g., the user login was at least partially responsible for the server crash).

Existing systems provide predefined functions that allow a network administrator or other user to create a relationship between two events. This relationship between two events is commonly referred to as a "correlation" between the two events. The predefined correlation functions provided by existing systems require the user to select from one of the predefined functions. If the correlation function desired by the user has not already been created, the user must request that the developer or supplier of the functions create a new function to meet the user's needs. If the developer or supplier is willing to create a new correlation function, this custom development work may be very expensive. Depending on the expected demand for the new correlation function, the developer or supplier may not be willing to create the requested function.

If the developer is unwilling to create a new correlation function or the cost is too high, the user can attempt to use an existing correlation function that is "closest" to the user's requirements. Such a solution may result in a significant number of unwanted event notifications or may result in a failure to notify the user of a desired sequence of events.

The system and method described herein addresses these limitations by providing a flexible correlation system and method that allows a user to correlate multiple events and/or data.

SUMMARY

The correlation system and method described herein supports the correlation of multiple events as well as the correlation of one or more events with one or more data elements. A flexible programming model is used to correlate events and/or data. This programming model allows for the creation of many different commonly used correlation functions as well as the creation of specialized correlation functions to meet the specific needs of a user. The predefined correlation functions allow the user to enter the particular event and/or data parameters to be monitored. These predefined correlation functions can be used without understanding the underlying programming model. However, a user with an understanding of the programming model is able to create custom correlation functions to meet particular needs. Thus, the user is not limited to using a particular set of predefined correlation functions.

The programming model provides a way to perform correlation by allowing the user to define state classes (e.g., a schema), configure actions that change the state (e.g., using an updating consumer and a programming language), and a way to link the occurrence of events to these actions.

In one embodiment, multiple events are received and applied to a correlation function. The correlation function is implemented as a state machine. A specific event is generated if the correlation function is satisfied by the multiple received events.

A described embodiment continues to receive additional events and apply the additional events to the correlation function if the correlation function is not satisfied by the multiple received events.

In another embodiment, multiple data elements are also received and applied to the correlation function.

A particular embodiment identifies a schema for creating state machines that correlate at least two events. An instance of a particular state machine is created and transitions for the particular state machine are defined by subscribing to at least one event. An update consumer is applied to the particular state machine to update the state of the particular state machine.

In a described embodiment, the particular state machine is deleted if the particular state machine reaches a final state.

In another embodiment, the particular state machine includes a timer such that the particular state machine is deleted if the timer expires.

DETAILED DESCRIPTION

The system and method described herein provides for the correlation of multiple events and/or data using a predefined set of correlation functions developed using a schema, which defines state classes and permits the use of a variety of different programming languages. The selected programming language is used to create state machines that implement correlation functions. Predefined state machines can be utilized without understanding the underlying programming language used to create the state machines. With an understanding of the programming language, custom state machines can be created to implement correlation functions that are not supported by the predefined set of state machines. The state machines can be applied to events generated by any event source in an enterprise. Similarly, state machines may correlate events from any event source with data from any data source in the enterprise. This programming model (i.e., the combination of the schema with the programming language) provides a way to perform correlation by allowing the user to define state classes, configure actions that change the state, and link the occurrence of events to these actions.

Web-Based Enterprise Management (WBEM) provides uniform access to management information throughout an enterprise. WBEM is an industry initiative to develop technology for accessing management information in an enterprise environment. This management information includes, for example, information on the state of system memory, inventories of currently installed client applications, and other information related to the status of the system. A particular embodiment of the event-handling system is represented using Windows Management Instrumentation (WMI) developed by Microsoft Corporation of Redmond, Wash., which provides an infrastructure to handle various events generated by event sources throughout an enterprise.

WMI technology enables systems, applications, networks, and other managed components to be represented using the Common Information Model (CIM) designed by the Distributed Management Task Force (DMTF). This model is used to perform correlation functions discussed herein. CIM is an extensible data model for representing objects that exist in typical management environments. CIM is able to model anything in the managed environment, regardless of the location of the data source. The Managed Object Format (MOF) language is used to define and store modeled data. In addition to data modeling, WMI provides a set of base services that include query-based information retrieval and event notification. Access to these services and to the management data is provided through a single programming interface.

WMI classes define the basic units of management. Each WMI class is a template for a type of managed object. For example, Win32_DiskDrive is a model representing a physical disk drive. For each physical disk drive that exists, there is an instance of the Win32_DiskDrive class. WMI classes may contain properties, which describe the data of the class and methods, which describe the behavior of the class.

WMI classes describe managed objects that are independent of a particular implementation or technology. WMI includes an everting subsystem that follows the publish-subscribe model, in which an event consumer subscribes for a selection of events (generated by one or more event providers) and performs an action as a result of receiving the event. WMI also provides a centralized mechanism for collecting and storing event data. This stored event data is accessible by other systems via WMI tools and/or application programming interfaces (APIs).

Although particular embodiments are discussed herein as using WMI, alternate embodiments may utilize any enterprise management system or application, whether web-based or otherwise. The event providers and event consumers discussed herein are selected for purposes of explanation. The teachings of the present invention can be used with any type of event provider and any type of event consumer. Additionally, the event-handling system and method described herein can be applied to any type of enterprise or other arrangement of computing devices, applications, and/or networks.

Figure 1:
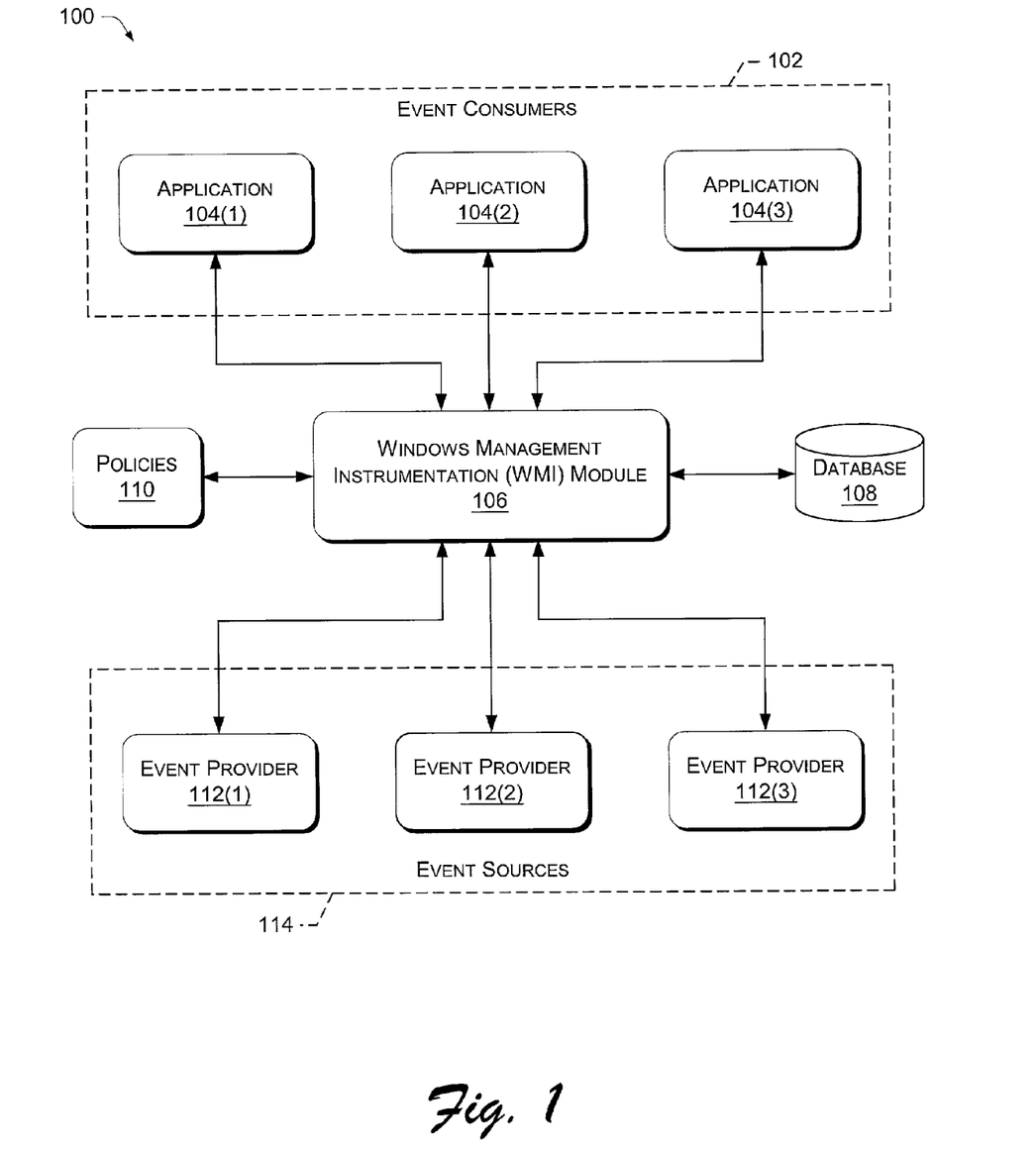
FIG. 1 illustrates a block diagram of a system that receives event information from multiple event providers and provides event information to multiple event consumers.

FIG. 1 illustrates a block diagram of a system 100 that receives event information from multiple event providers 114 (i.e., event sources) and provides event information to multiple event consumers 102 (i.e., the users of the event data). System 100 includes a WMI module 106, which receives event data from multiple event sources 114 and receives requests for information (e.g., notification of particular events) from multiple event consumers 102. The multiple event sources are identified as event providers 112. The multiple event consumers are identified as applications 104.

Event providers 112 include, for example, systems, services or applications that generate event data. An exemplary event provider is a disk drive (or an application that monitors the status of a disk drive). The disk drive may generate an event indicating the available storage capacity on the disk drive or indicating the amount of data currently stored on the disk drive. The disk drive may also generate an event indicating that the disk drive is nearly full of data (e.g., when ninety-five percent or more of the disk drive's capacity is used).

Event consumers 102 may request to be notified of certain events (also referred to as "subscribing" to an event). An example event consumer is an application that manages multiple storage devices in an enterprise. The application may request to receive events generated by any of the disk drives or other storage devices in the enterprise. The application can use this event information to distribute storage tasks among the multiple storage devices based on the available capacity of each device and/or the quantity of read or write requests received by each storage device.

System 100 also includes a set of policies 110, which are accessible by WMI module 106. Policies 110 may control the configuration of one or more systems in the enterprise. Other policies may define various activities, such as event filtering, event correlation, and the forwarding of events to particular devices or applications. A database 108 is coupled to WMI module 106. Database 108 stores various information related to the enterprise. For example, database 108 can store event data (i.e., creating an event log), policy data, and enterprise configuration information.

The WMI module 106 uses WMI features to provide a distributed architecture that is capable of selecting, filtering, correlating, forwarding, storing, and delivering event data in an enterprise. The WMI module also allows event consumers to request data related to a particular event, request data from a particular node or device in the enterprise, define the manner in which events are correlated with one another, define how certain events should be forwarded, and define how to store event data.

The WMI module 106 provides a policy-based administration of the enterprise. The policy infrastructure allows administrators to set a policy in the Directory Service (DS) and the WMI module ensures that the proper set of WMI objects (e.g., filters, bindings, correlators, consumers, and configuration objects) are delivered to the proper devices or applications in the enterprise.

As shown in FIG. 1, policies 110 and database 108 are separate from WMI module 106. However, in alternate embodiments, policies 110 and/or database 108 may be integrated into WMI module 106.

Table 1 below identifies various types of event providers available in a particular embodiment. Additionally, the table includes a description of the events generated by each event provider. For example, the Win32 Provider generates events that include information related to the operating system, computer system, peripheral devices, file systems, and security for a particular device (such as a computer system) in the enterprise.

TABLE 1

| Event Provider | Description of Events Provided |
| --- | --- |
| Win32 Provider | Supplies information about the operating system, computer system, peripheral devices, file systems, and security. |
| WDM Provider | Supplies low-level Windows Driver Model (WDM) information for user input devices, storage devices, network interfaces, and communications ports. |
| Performance Counter Provider | Exposes the raw performance counter information used to compute various performance values. |
| Windows Installer Provider | Supplies information about applications installed with the Windows Installer. |

Figure 2:
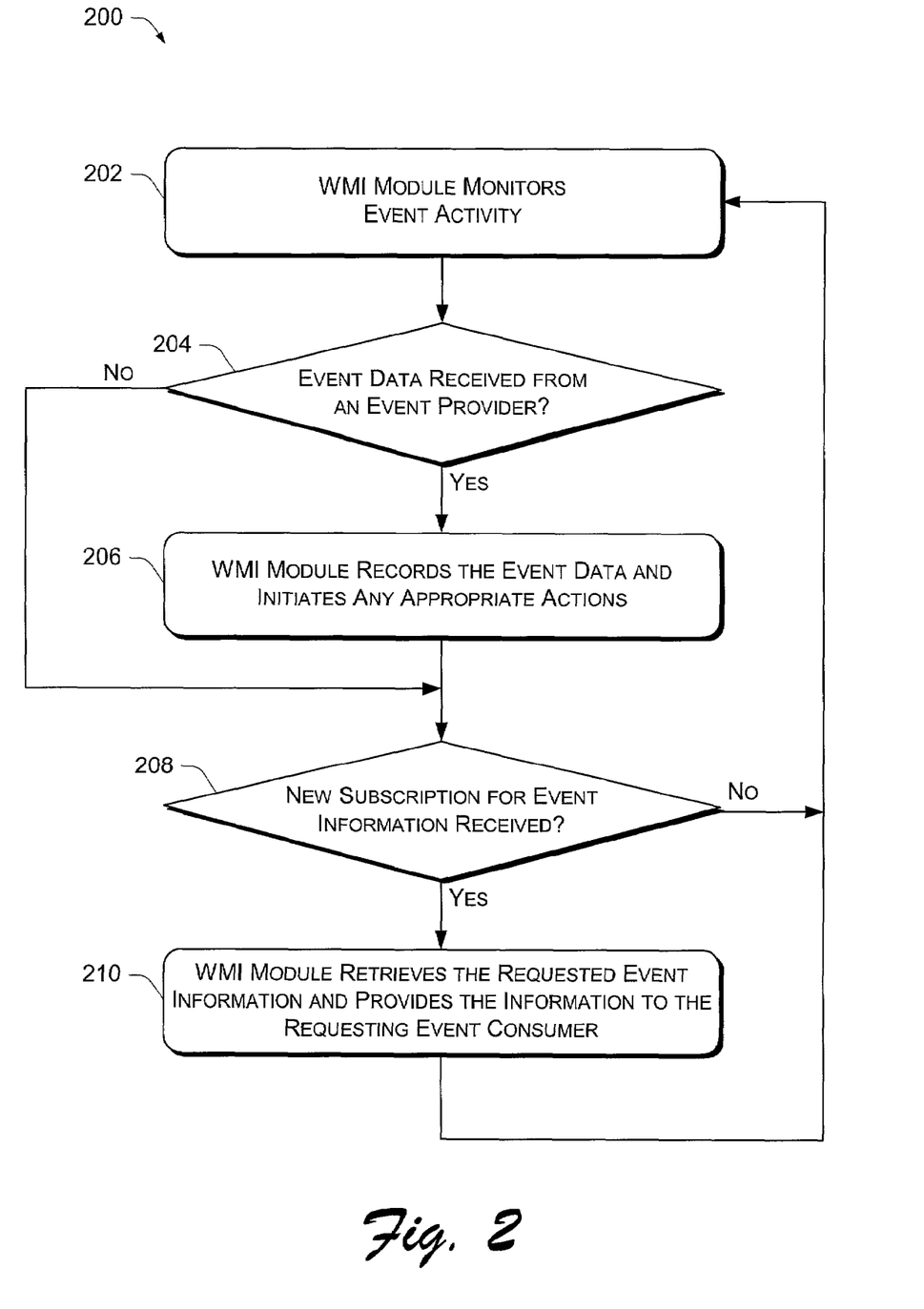
FIG. 2 is a flow diagram illustrating an event-handling procedure.

FIG. 2 is a flow diagram illustrating an event-handling procedure 200. The WMI module monitors event activity throughout the enterprise (block 202). The procedure 200 determines whether event data has been received from an event provider (block 204). If event data has been received, the WMI module records the event data and initiates any appropriate actions (block 206). An example action includes notifying an event consumer of the event (e.g., if the event consumer previously subscribed to such an event).

At block 208, the procedure 200 determines whether a new subscription for event information has been received. The procedure 200 may also determine whether a request to revise an existing subscription has been received. If a new subscription (or a revised subscription) is received, the procedure continues to block 210 where the WMI module retrieves the requested event information and provides the information to the requesting event customer. Alternatively, the procedure may log the subscription request and notify the requesting event consumer when the next event is received that qualifies under the consumer's subscription request.

Figure 3:
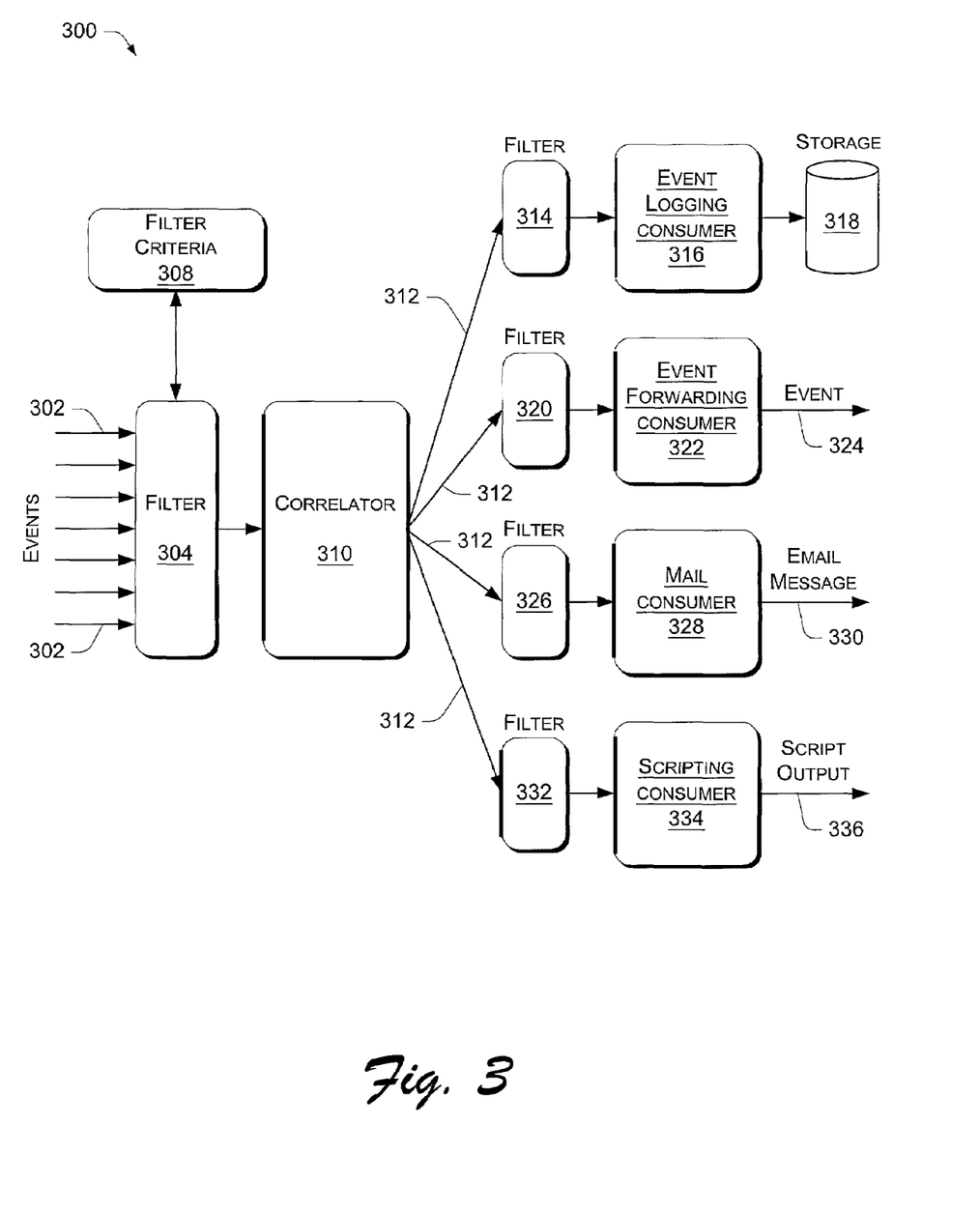
FIG. 3 illustrates a block diagram of a system that receives multiple events from various event sources, filters the events, and distributes the filtered events to multiple event consumers.

FIG. 3 illustrates a block diagram of a system 300 that receives multiple events from various event sources, filters the events, and distributes the filtered events to multiple event consumers. Multiple events 302 are received by an event filter 304 that determines which of the received events are passed through the filter to a correlator 310. The filter 304 applies various filter criteria 308 to the received events in determining which events pass through the filter to correlator 310. Additional details regarding correlator 310 and the correlation functions are discussed below.

The correlator 310 correlates various events and creates additional events 312 that are provided to multiple filters 314, 320, 326, and 332. Each filter 314, 320, 326, and 332 includes various filter criteria that determines what event characteristics are required to allow the event to pass through the filter. Although each event 312 is sent to all four filters, the event may be rejected (i.e., not pass through the filter) by any or all of the filters. Similarly, a particular event may pass through two or more different filters, depending on the filter criteria associated with each filter.

Each filter 314, 320, 326, and 332 is associated with a consumer (i.e., an event consumer) 316, 322, 328, and 334, respectively. For example, events that pass through filter 314 are provided to event logging consumer 316, which logs the event data to a storage device 318. The logged data can be retrieved at a later time for analysis or other purposes. Events that meet the criteria of filter 320 are provided to event forwarding consumer 322, which generates a forwarded event 324 that is distributed to one or more destinations. Events that satisfy the criteria of filter 326 are provided to mail consumer 328, which generates and sends an email message 330 in response to receipt of each event. The email message 330 may contain information about one or more events (such as the event type or the source of the event). Events that pass through filter 332 are provided to scripting consumer 334, which executes a script that may perform a function and/or generate a script output 336.

Although the example of FIG. 3 illustrates four filters 314, 320, 326, and 332 (and associated consumers 316, 322, 328, and 334, respectively) that receive events 312, alternate embodiments may include any number of filters and associated consumers. Further, the actions performed by consumers 316, 322, 328, and 334 are provided as examples. Alternate consumers may perform any type of action in response to receiving an event.

Figure 4:
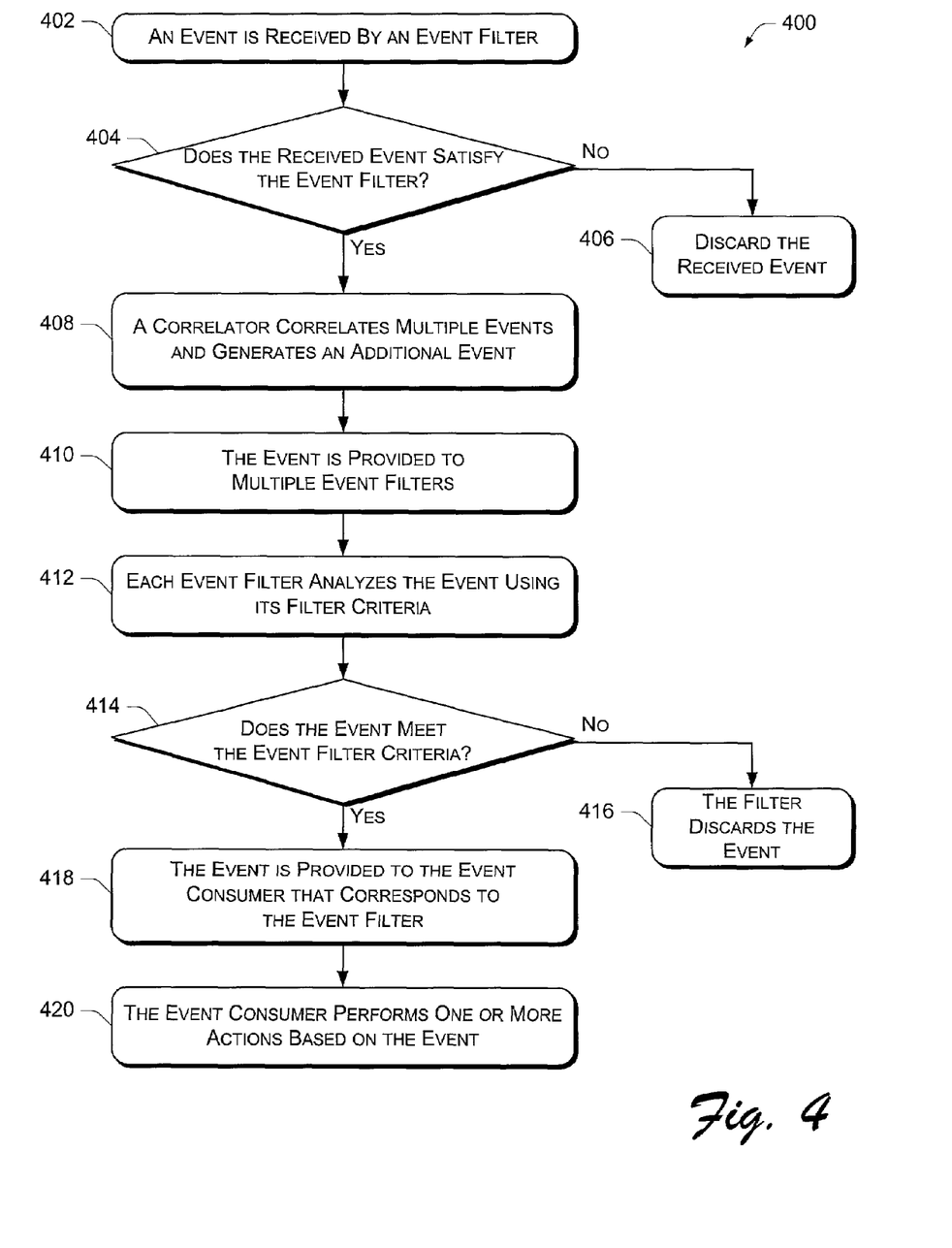
FIG. 4 is a flow diagram illustrating a procedure for handling events in the system of FIG. 3.

FIG. 4 is a flow diagram illustrating a procedure 400 for handling events in the system of FIG. 3. An event is received by an event filter (block 402), such as filter 304 in FIG. 3. The procedure 400 determines whether the received event satisfies the event filter (block 404). Satisfying the event filter includes satisfying the filter criteria (e.g., filter criteria 308). If the received event does not satisfy the event filter, then the received event is discarded (block 406). Discarding an event may include ignoring the event or deleting the event and any reference to the event from storage registers or other storage mechanisms. If the received event satisfies the event filter (i.e., passes through the filter), a correlator correlates multiple received events (block 408) and may generate one or more new events that are provided to multiple event filters (e.g., filters 314, 320, 326, and 332 in FIG. 3) in block 410.

Each event filter analyzes the event using its own filter criteria (block 412). Next, each event filter determines whether the event meets the event filter's criteria (block 414). This determination is performed by each event filter based on the filter criteria for that particular event filter. If the event does not meet the criteria for a particular event filter, that event filter discards the event (block 416). However, if the event satisfies the criteria for a particular event filter, that event filter passes the event to the event consumer that corresponds to the particular event filter (block 418). The event consumer then performs one or more actions based on the event (block 420). For example, the actions may include generating an email message or forwarding the event to another system. The procedure of FIG. 4 is repeated for each received event.

Figure 5:
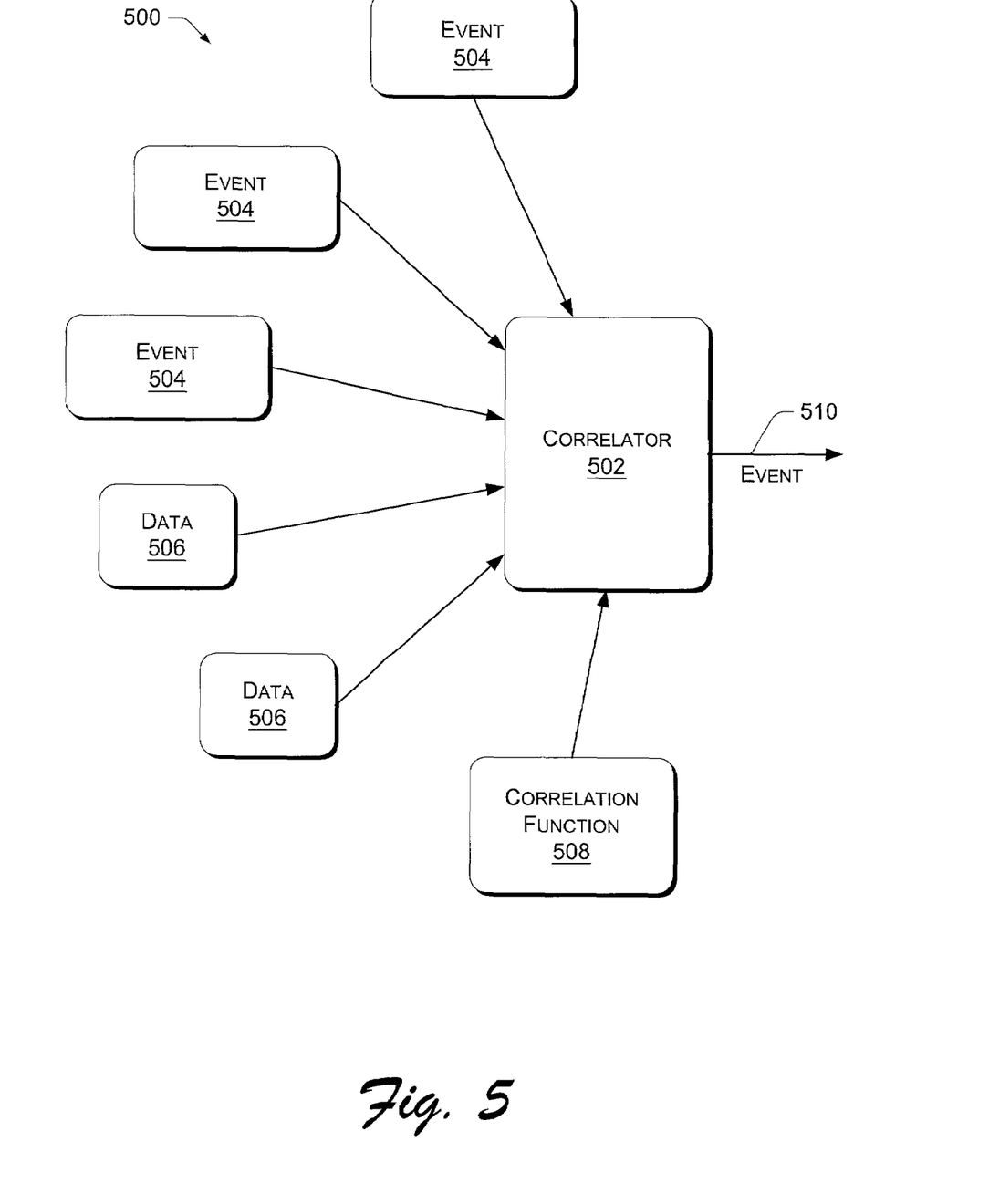
FIG. 5 illustrates a block diagram of an exemplary system in which a correlator receives events, data, and correlation functions from multiple sources.

FIG. 5 illustrates a block diagram of an exemplary system 500 in which a correlator 502 receives events 504, data elements 506, and correlation functions 508 from multiple sources. Events 504 have passed through a filter (e.g., filter 304 in FIG. 3) prior to being received by correlator 502. The terms "data" and "data elements" are used interchangeably herein. Correlator 502 may be similar to the correlator 310 (FIG. 3) discussed above. Correlator 502 may receive events 504 directly from an event source or may receive events through an event filter, such as filter 304 discussed above. In one embodiment, correlator 502 receives specific event information based on event subscriptions applied to various event sources in the enterprise. Correlator 502 may receive data elements 506 directly from a data source or may receive the data through an intermediate device, such as a database or other data storage or data collection device. Correlator 502 also receives correlation functions from one or more sources, such as from an administrator's node. The correlation function 508 is a group of updating consumers (discussed below) that receive events like other consumers. These updating consumers cause one or more events 510 to occur (either directly or indirectly).

Correlator 502 applies the received correlation functions to the events and data received from various sources throughout the enterprise. When the conditions of a particular correlation function are satisfied, correlator 502 generates an event 510, which is distributed to various event consumers in the enterprise. In one embodiment, the event 510 is provided to event consumers that subscribed to receive that particular event.

Figure 6:
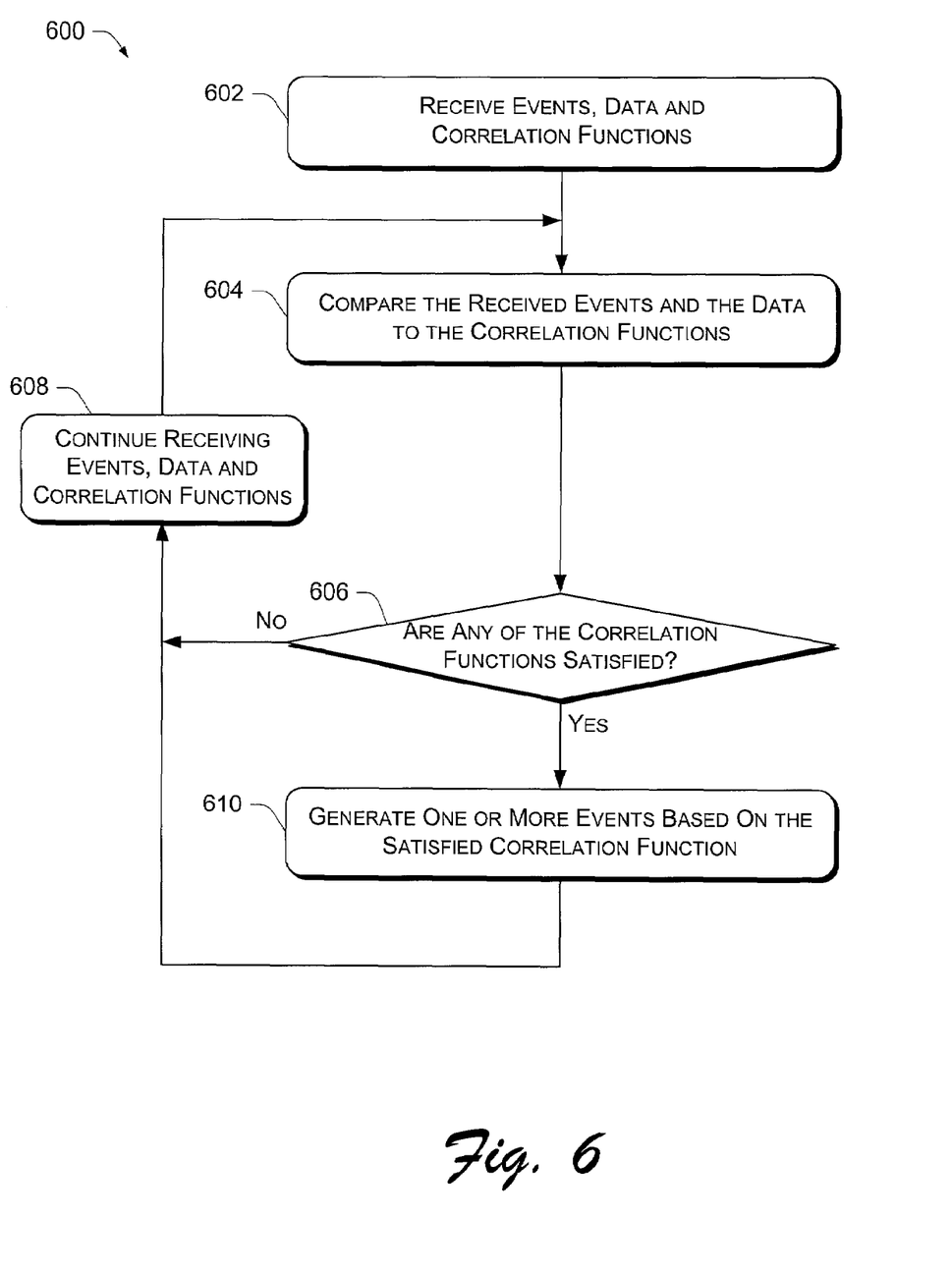
FIG. 6 is a flow diagram illustrating a procedure for correlating events and/or data in an enterprise.

FIG. 6 is a flow diagram illustrating a procedure 600 for correlating events and/or data in an enterprise. A correlator (e.g., correlator 502 in FIG. 5) receives events, data and correlation functions from multiple sources in an enterprise (block 602). The received events and data are compared to the correlation functions (block 604). The procedure 600 next determines whether any of the correlation functions are satisfied by the received events and data (block 606). If not, the procedure 600 continues receiving events, data and correlation functions (block 608), and returns to block 604 to continue comparing received events and data to the correlation functions. If any of the correlation functions are satisfied by the received events and data, the correlator generates one or more events based on the satisfied correlation function (block 610). After generating one or more events in block 610, the procedure 600 continues to block 608 to continue receiving events, data and correlation functions.

Figure 7:
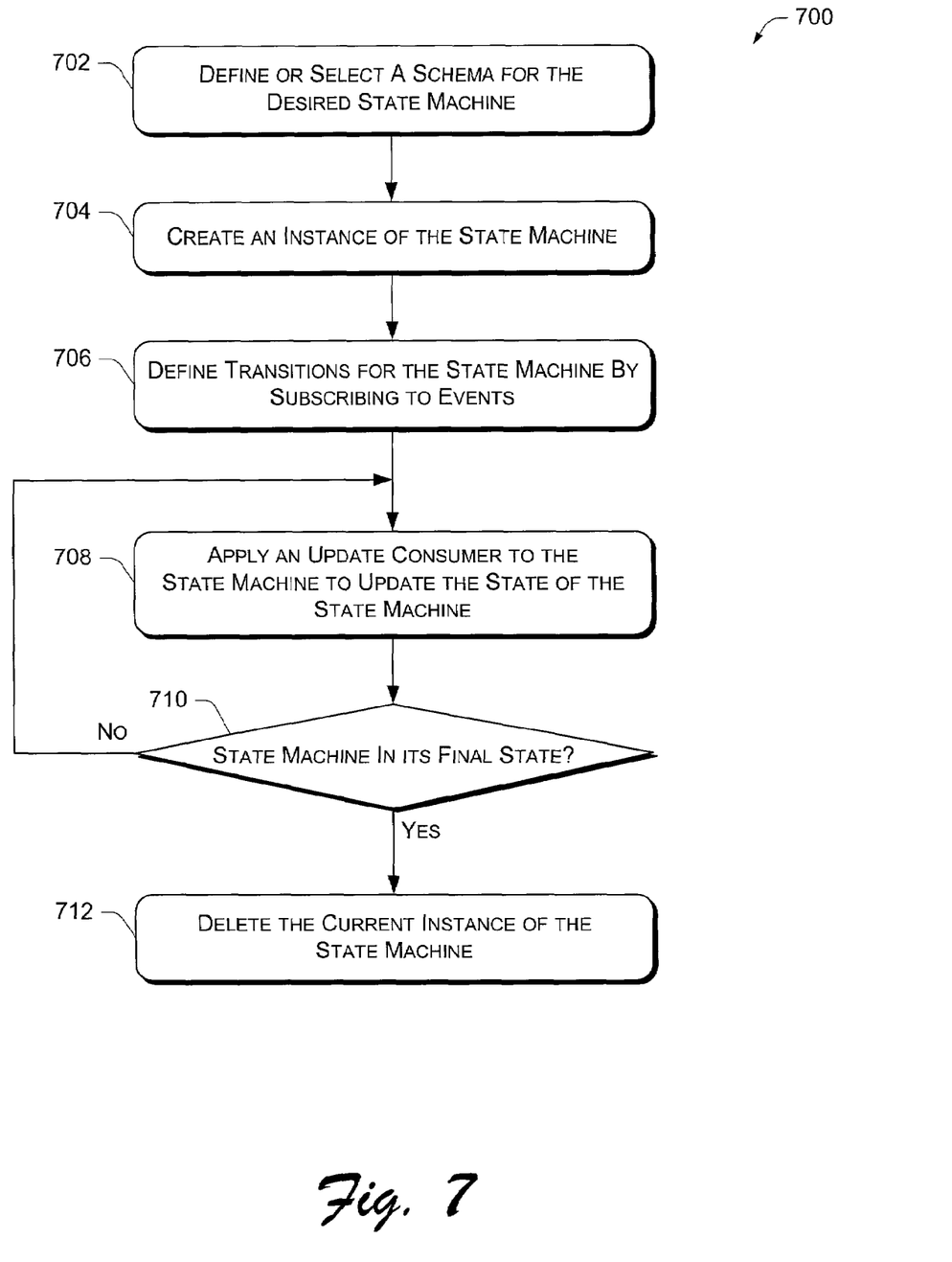
FIG. 7 is a flow diagram illustrating a procedure for implementing a state machine that applies a correlation function.

FIG. 7 is a flow diagram illustrating a procedure 700 for implementing a state machine that is capable of implementing a correlation function. Initially, a user defines or selects a pre-defined schema for the desired state machine (block 702). Next, an instance of the desired state machine is created (block 704). Transitions for the state machine are defined by subscribing to one or more events (block 706).

An update consumer is applied to the state machine to update the state of the state machine (block 708). The updating consumer is applied to the state machine each time an event to which the updating consumer has subscribed occurs.

Procedure 700 then determines whether the state machine is in its final state (block 710). If the state machine is not in its final state, the procedure 700 returns to block 708 to again apply the update consumer to the state machine. If the state machine is in its final state, the procedure 700 continues to block 712, which deletes the current instance of the state machine. If another correlation function is to be implemented, a new instance of the desired state machine is created and executed.

Examples of events include a server crash, a user logging into the system, or a particular device becoming unavailable. Example data elements include the available disk space, the current memory utilization, and the number of users logged into particular servers. An example correlation function that correlates two events generates an email message when two different server crashes occur within five second of one another. An example correlation function that correlates an event with data generates an event when a server crashes and the available storage space on the server's hard drive is less than five megabytes. Another example correlation function pages an administrator when the available storage space on a server's hard disk stays below ten megabytes for at least five minutes. Any other selection of events and/or data can be combined to create a correlation function based on the desires of an administrator or other user.

As mentioned above, a state machine implements a desired correlation function that correlates events and/or data. A set of commonly used state machines are provided for use by administrators (or other users) in defining correlation functions. These commonly used state machines require the administrator to fill in certain parameters, but the administrator is not required to understand the programming language used to create the state machine. If the set of commonly used state machines does not include a state machine that performs the desired correlation function, a new state machine can be created using the appropriate programming language. The programming language can be any database language or other non-procedural language. In a particular embodiment, the programming language is SQL.

Each state machine is a class object. One or more instances of a state machine can be implemented simultaneously to monitor different events and data. In a particular enterprise, any number of instances of state machines may be operating simultaneously. In one embodiment of the invention, SQL is used to query various states in any state machine.

In a particular example, the schema for a state machine that detects a specific number of process crashes within a specified time period can be defined as follows.

```
Class StateA
{
string ProcessName;
int NumCrashes;
int RemainingTime;
}
```

In the above example, the state machine is a class having three properties. ProcessName is a string that represents the name of the process being monitored for crashes. Num-Crashes is an integer that identifies the number of crashes that will trigger an event if those crashes occur within a particular time period, which is defined by the property RemainingTime, which is an integer value. The RemainingTime property is reset each time a new instance of StateA is created. If RemainingTime reaches zero without being reset, an event is triggered indicating that the state machine time expired before detecting the specified number of crashes. When RemainingTime reaches zero, that particular instance of StateA is deleted because the specified parameters were not satisfied within the particular time period.

An administrator wanting to use the correlation function defined by StateA first creates an instance of StateA. The administrator then provides a value for NumCrashes and RemainingTime. Thus, the administrator need not understand the complete syntax of the state machine and need not understand the programming language used to define and create the state machine.

After defining the schema for the StateA state machine, the transitions for the state machine (i.e., the transitions from one state to another) are defined by subscribing to various events. Specifically, the transition is defined by the updating consumer and the event that causes the transition is defined by the event subscription. These event subscriptions function as the transitions for the state machine. When an appropriate event occurs, the state machine transitions to the next state. The state machine transitions are defined by identifying the event that will cause the transition and identifying the action to perform based on the occurrence of the event. The action may include, for example, generating an email message, logging event data to a file, or forwarding an event to one or more destinations. The transitions are defined using updating consumer instances.

After defining the transitions for the state machine, an updating consumer is used to update the state of the state machine. The updating consumer (named "update") is a class object. One or more instances of the updating consumer can be implemented simultaneously to handle the updating of different state machines. An example updating consumer implementation is illustrated below.

```
Update         StateA          where
ProcessName=ThisEvent.ProcessName
   set NumCrashes=NumCrashes+1
```

In this example, the updating consumer updates an instance of state machine StateA, defined above. The ProcessName property is defined as "ThisEvent.ProcessName", which inserts the name of the process that crashed (which is identified in the received crash event) as "ThisEvent". The property NumCrashes is incremented by one each time a crash event is received.

While a particular state machine is operating, the various internal states of the state machine can be obtained (e.g., queried). This allows an administrator or other user to observe the correlation as the various events occur in a system. Even if the conditions have not yet been met to generate the appropriate event, the administrator can observe the current state or value of different properties (e.g., how many crashes have occurred or how much time is left before the state machine is reset). The ability to observe the various states and properties of the state machine assists with troubleshooting and determining whether the desired correlation function has been properly established.

Various examples have been discussed herein in which two different events are correlated with one another or an event is correlated with data. However, in alternate embodiments, any number of events can be combined together to form a correlation function. Similarly, any number of events can be combined with one or more data elements to create a correlation function.

The following example illustrates classes and class instances, a correlation scenario, updating consumers, filters and bindings as used with the present invention. Example class and instances of the class:

```
class ExampleClass
{
[key] string Name;
boolean Prop;
};
instance of ExampleClass
{
Name="A";
Prop TRUE;
};
instance of ExampleClass
{
Name="B";
Prop=FALSE;
};
```

The correlation scenario is defined:

```
[dynamic, provider("Microsoft WMI Transient Provider")]
class ExampleCorrelationState: MSFT_CorrelationStateBase
{
boolean ReceivedEventA;
boolean ReceivedEventB;
[trns_egg_timer] uint32 Timer;
};
Class BothAandBEvent: MSFT_UCEventBase
{
string Name;
};
instance of MSFT_UpdatingConsumer as $UI
{
Id="Initializer";
Scenario="ExampleCorrelationScenario";
Commands={"INSERT INTO ExampleCorrelationState"
   "(Id, Scenario, ReceivedEventA, ReceivedEventB, Timer)"
   "('ExampleCorrelationState', 'ExampleCorrelationScenario',"
   "FALSE, FALSE, 0)"};
};
instance of MSFT_UpdatingConsumer as $UA
{
Id="SetEventA";
Scenario="ExampleCorrelationScenario";
Commands={"UPDATE ExampleCorrelationState"
   "SET ReceivedEventA=TRUE, Timer=5"
   "WHERE Scenario='ExampleCorrelationScenario'"};
};
instance of MSFT_UpdatingConsumer as $UB
{
Id="SetEventB";
Scenario="ExampleCorrelationScenario";
Commands={"UPDATE ExampleCorrelationState"
   "SET ReceivedEventB=TRUE, Timer=5"
   "WHERE Scenario='ExampleCorrelationScenario'"};
};
```

The $UA and $UB updating consumers cause the timer to be reset to five seconds whenever either EventA or Event B occurs. The next updating consumer causes the ReceivedEventA and the ReceivedEventB to be reset when the timer expires.

```
instance of MSFT_UpdatingConsumer as $UTE
{
Id="ResetTimer";
Scenario="ExampleCorrelationScenario";
Commands={"UPDATE ExampleCorrelationState"
    "SET            ReceivedEventA=FALSE,
        ReceivedEventB=FALSE"
    "WHERE Scenario='ExampleCorrelationScenario'"};
};
```
The following defines filters and bindings to fully define the scenario:
```
instance of _EventFilter as $FSC
{
Name="ScenarioCreation";
Query="SELECT*FROM_InstanceCreationEvent"
    "WHERE TargetInstance ISA 'MSFT_UCScenario'"
    "AND
        TargetInstance.Id='ExampleCorrelationScenario'";
QueryLanguage="WQL";
};
instance of _EventFilter as $FSM
{
Name="ScenarioModification";
Query="SELECT*FROM_InstanceModificationEvent"
    "WHERE TargetInstance ISA 'MSFT_UCScenario'"
    "AND
        TargetInstance.Id='ExampleCorrelationScenario'";
QueryLanguage="WQL";
};
instance of _EventFilter as $FBOOT
{
Name="OnBoot";
Query="SELECT*FROM    MSFT_TransientReboo-
    tEvent";
QueryLanguage="WQL";
};
instance of _EventFilter as $FA
{
Name="EventAFilter";
Query="SELECT*FROM_InstanceModificationEvent"
    "WHERE TargetInstance ISA 'ExampleClass'"
    "AND TargetInstance.Name='A'";
QueryLanguage="WQL";
};
instance of _EventFilter as $FB
{
Name="EventBFilter";
Query="SELECT*FROM_InstanceModificationEvent"
    "WHERE TargetInstance ISA 'ExampleClass'"
    "AND TargetInstance.Name='B'";
QueryLanguage="WQL";
};
instance of _EventFilter as $FTE
{
Name="TimerExpiredEvent";
Query="SELECT*FROM    MSFT_TransientEggTimer-
    Event"
    "WHERE Object ISA \"ExampleCorrelationState\""
    "AND
        Object.Scenario='ExampleCorrelationScenario'";
QueryLanguage"WQL";
};
```
Defining the bindings:
```
instance of _FilterToConsumerBinding
{
Filter=$FSC;
Consumer=$UI;
};
instance of _FilterToConsumerBinding
{
Filter=$FSM;
Consumer=$UI;
};
instance of _FilterToConsumerBinding
{
Filter=$FBOOT;
Consumer=$UI;
};
instance of _FilterToConsumerBinding
{
Filter=$FA;
Consumer=$UA;
};
instance of _FilterToConsumerBinding
{
Filter=$FB;
Consumer=$UB;
};
instance of _FilterToConsumerBinding
{
Filter=$FTE;
Consumer=$UTE;
};
```
When creating this updating consumer scenario, the activation can be triggered to occur using the MSFT_UCScenario instance. Since, in this example, the system would have $CI consumer tied to the creation of the Scenario instance, the following instantiation would cause the initialization to occur:
```
instance of MSFT_UCScenario
{
Id="ExampleCorrelationScenario";
Name="ExampleCorrelationScenario";
};
```
This instance helps the updating consumer provider determine how state instances relate to the scenario:
```
instance of MSFT_UCScenarioAssociationInfo
{
Id="StateAssociation";
Scenario="ExampleCorrelationScenario";
Query="SELECT*FROM ExampleCorrelationState"
    "WHERE Scenario='ExampleCorrelationScenario'";
};
```
Finally, an example filter to determine when both events occurred within the windows:
```
instance of _EventFilter as $FBOTH
{
Name="BothEventsOccurred";
Query="SELECT*FROM_InstanceModificationEvent"
    "WHERE TargetInstance ISA \"ExampleCorrelation-
        State\""
    "AND TargetInstance.ReceivedEventA=TRUE"
    "AND TargetInstance.ReceivedEventB=TRUE"
    "AND TargetInstance.Scenario='ExampleCorrelation
        Scenario'";
QueryLanguage="WQL";
};
```
To create a custom event that is triggered when this condition is met, then the user can subscribe an updating consumer to it:
```
instance of MSFT_UpdatingConsumer as $UBOTH
```

```
{
Id="BothEventsOccurred";
Scenario="ExampleCorrelationScenario";
Commands={"INSERT INTO BothAandBEvent(Name)"
   "('ExampleCorrelationScenario')"};
};
instance of _FilterToConsumerBinding
{
Filter=$FBOTH;
Consumer=$UBOTH;
};
```

Figure 8:
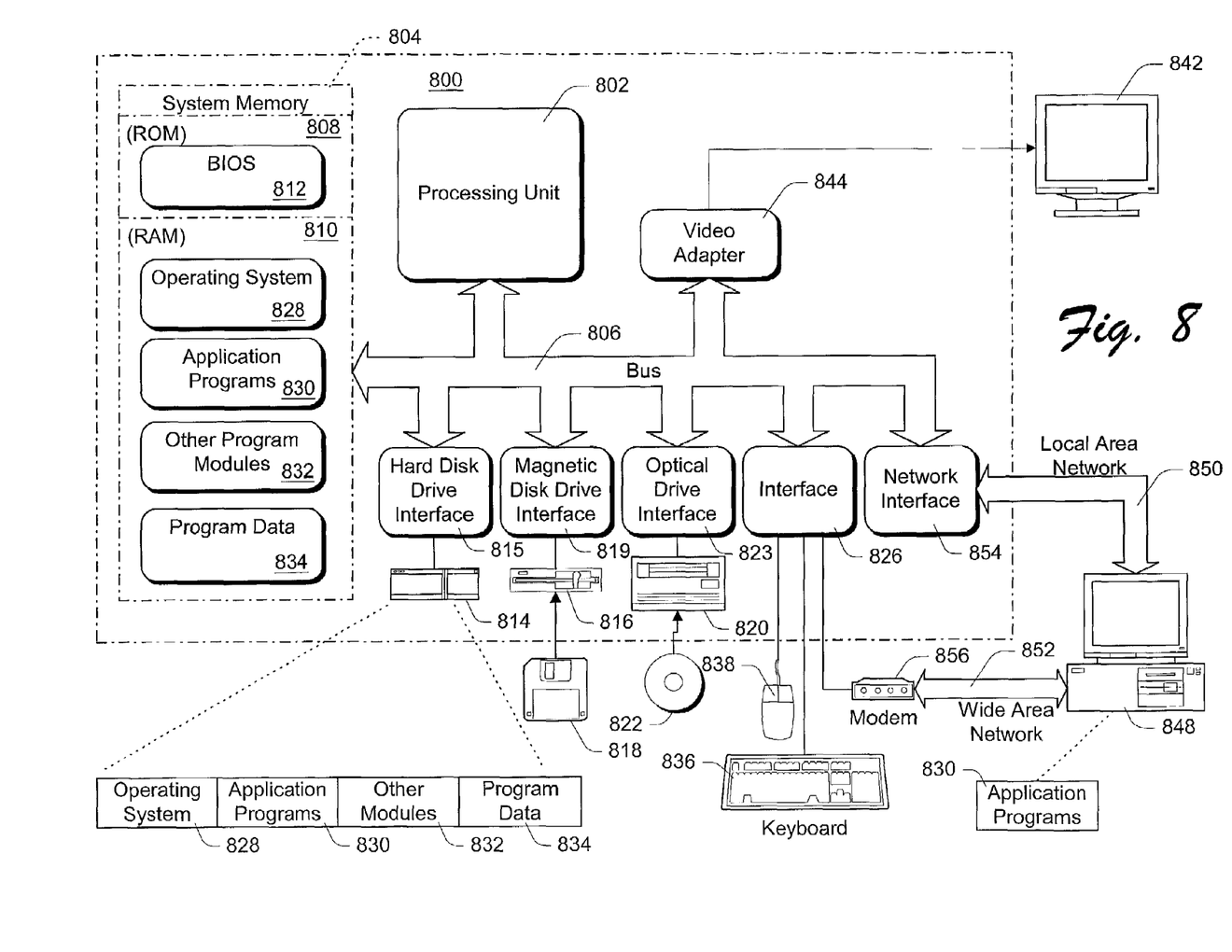
FIG. 8 illustrates an example of a suitable operating environment in which the event distribution and event handling system and method may be implemented.

FIG. 8 illustrates an example of a suitable operating environment in which the event correlation system and method may be implemented. The illustrated operating environment is only one example of a suitable operating environment and is not intended to suggest any limitation as to the scope of use or functionality of the invention. Other well-known computing systems, environments, and/or configurations that may be suitable for use with the invention include, but are not limited to, personal computers, server computers, hand-held or laptop devices, multiprocessor systems, microprocessor-based systems, programmable consumer electronics, gaming consoles, cellular telephones, network PCs, minicomputers, mainframe computers, distributed computing environments that include any of the above systems or devices, and the like.

FIG. 8 shows a general example of a computer 800 that can be used in accordance with the invention. Computer 800 is shown as an example of a computer that can perform the various functions described herein. Computer 800 includes one or more processors or processing units 802, a system memory 804, and a bus 806 that couples various system components including the system memory 804 to processors 802.

The bus 806 represents one or more of any of several types of bus structures, including a memory bus or memory controller, a peripheral bus, an accelerated graphics port, and a processor or local bus using any of a variety of bus architectures. The system memory 804 includes read only memory (ROM) 808 and random access memory (RAM) 810. A basic input/output system (BIOS) 812, containing the basic routines that help to transfer information between elements within computer 800, such as during start-up, is stored in ROM 808. Computer 800 further includes a hard disk drive 814 for reading from and writing to a hard disk, not shown, connected to bus 806 via a hard disk drive interface 815 (e.g., a SCSI, ATA, or other type of interface); a magnetic disk drive 816 for reading from and writing to a removable magnetic disk 818, connected to bus 806 via a magnetic disk drive interface 819; and an optical disk drive 820 for reading from and/or writing to a removable optical disk 822 such as a CD ROM, DVD, or other optical media, connected to bus 806 via an optical drive interface 823. The drives and their associated computer-readable media provide nonvolatile storage of computer readable instructions, data structures, program modules and other data for computer 800. Although the exemplary environment described herein employs a hard disk, a removable magnetic disk 818 and a removable optical disk 822, it will be appreciated by those skilled in the art that other types of computer readable media which can store data that is accessible by a computer, such as magnetic cassettes, flash memory cards, random access memories (RAMs), read only memories (ROM), and the like, may also be used in the exemplary operating environment.

A number of program modules may be stored on the hard disk, magnetic disk 818, optical disk 822, ROM 808, or RAM 810, including an operating system 828, one or more application programs 830, other program modules 832, and program data 834. A user may enter commands and information into computer 800 through input devices such as keyboard 836 and pointing device 838. Other input devices (not shown) may include a microphone, joystick, game pad, satellite dish, scanner, or the like. These and other input devices are connected to the processing unit 802 through an interface 826 that is coupled to the system bus (e.g., a serial port interface, a parallel port interface, a universal serial bus (USB) interface, etc.). A monitor 842 or other type of display device is also connected to the system bus 806 via an interface, such as a video adapter 844. In addition to the monitor, personal computers typically include other peripheral output devices (not shown) such as speakers and printers.

Computer 800 operates in a networked environment using logical connections to one or more remote computers, such as a remote computer 846. The remote computer 846 may be another personal computer, a server, a router, a network PC, a peer device or other common network node, and typically includes many or all of the elements described above relative to computer 800, although only a memory storage device 848 has been illustrated in FIG. 8. The logical connections depicted in FIG. 8 include a local area network (LAN) 850 and a wide area network (WAN) 852. Such networking environments are commonplace in offices, enterprise-wide computer networks, intranets, and the Internet. In certain embodiments, computer 800 executes an Internet Web browser program (which may optionally be integrated into the operating system 828) such as the "Internet Explorer" Web browser manufactured and distributed by Microsoft Corporation of Redmond, Wash.

When used in a LAN networking environment, computer 800 is connected to the local network 850 through a network interface or adapter 854. When used in a WAN networking environment, computer 800 typically includes a modem 856 or other means for establishing communications over the wide area network 852, such as the Internet. The modem 856, which may be internal or external, is connected to the system bus 806 via a serial port interface 826. In a networked environment, program modules depicted relative to the personal computer 800, or portions thereof, may be stored in the remote memory storage device. It will be appreciated that the network connections shown are exemplary and other means of establishing a communications link between the computers may be used.

Computer 800 typically includes at least some form of computer readable media. Computer readable media can be any available media that can be accessed by computer 800. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computer 800. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The invention has been described in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A computer-implemented method comprising:
receiving a plurality of events;
applying the plurality of events to a correlation function, wherein the correlation function is implemented as a state machine in a first programming language and is 1) configured to correlate the plurality of events and 2) implemented using a schema which defines state classes and permits the use of a variety of different programming languages by developers;
identifying an event to which an update consumer has subscribed, wherein the update consumer is:
a class object separate from the state machine that defines transition operations for the state machine in said first programming language in lieu of when the state machine is defined; and
configured to update the state machine when the event to which the update consumer has subscribed occurs by invoking said transition operations;
applying the update consumer to the state machine in response to the identified event; and
generating a specific event if the correlation function is satisfied by the plurality of events.

2. A method as recited in claim 1 further including:
receiving a data element; and
applying the data element and at least one of the plurality of events to the correlation function.

3. A method as recited in claim 1 further including:
receiving a plurality of data elements; and
applying the plurality of data elements and the plurality of events to the correlation function.

4. A method as recited in claim 1 further including communicating the specific event to at least one event consumer that subscribed to the specific event.

5. A method as recited in claim 1 further including continuing to receive additional events and apply the additional events to the correlation function if the correlation function is not satisfied by the plurality of events.

6. A method as recited in claim 1 further including resetting the correlation function after generating a specific event.

7. A method as recited in claim 1 further including:
creating an instance of a particular state machine; and
defining transitions for the particular state machine by subscribing to at least one event.

8. A method as recited in claim 7 further including deleting the instance of the particular state machine if the instance of the particular state machine reaches a final state.

9. One or more computer storage media containing a computer program that is executed by a processor to perform the method recited in claim 1.

10. A computer-implemented method comprising:
receiving a plurality of events;
receiving a plurality of data elements;
identifying a plurality of correlation functions configured to correlate the plurality of events and the plurality of data elements, wherein each correlation function is implemented with an associated state machine in a first programming language, and implemented using a schema which defines state classes and permits the use of a variety of different programming languages by developers; and wherein each state machine has an associated update consumer provided as a class object separate from the associated state machine that defines transition operations for the state machine in said first programming language in lieu of when the state machine is defined and that updates the state of the associated state machine based on an subscribed event;
applying the plurality of events and plurality of data elements to the plurality of correlation functions, including updating the state machine when the event to which the update consumer has subscribed occurs by invoking the transition operations; and
generating a specific event if at least one of the plurality of correlation functions is satisfied.

11. A method as recited in claim 10 further comprising deleting a particular state machine when the particular state machine reaches a final state.

12. A method as recited in claim 10 further including communicating the specific event to at least one event consumer that subscribed to receive the specific event.

13. A method as recited in claim 10 further including:
receiving additional events;
receiving additional data elements; and
applying the plurality of events, the additional events, the plurality of data elements and the additional data elements to the plurality of correlation functions.

14. A method as recited in claim 10 further including:
receiving additional events;
receiving additional data elements;
receiving additional correlation functions; and
applying the plurality of events, the additional events, the plurality of data elements and the additional data elements to the plurality of correlation functions and the additional correlation functions.

15. A method as recited in claim 14 further including generating the specific event if at least one of the plurality of correlation functions or at least one of the additional correlation functions is satisfied.

16. A method as recited in claim 10 wherein the specific event generated is dependent on which correlation function is satisfied.

17. One or more computer storage media containing a computer program that is executed by a processor to perform the method recited in claim 10.

18. A computer-implemented method comprising:
identifying a schema for creating state machines, wherein the state machines correlate at least two events and the schema defines state classes and permits the use of a variety of different programming languages by developers;
creating an instance of a particular state machine implemented in a first programming language;
defining transitions for the particular state machine in the first programming language by subscribing to at least one event by an update consumer; and
applying the update consumer to the particular state machine to update the state of the particular state machine, wherein the update consumer is a class object provided separate from the particular state machine that defines and invokes transition operations for the state machine in lieu of when the state machine is defined.

19. A method as recited in claim 18 further including deleting the particular state machine if the particular state machine reaches a final state.

20. A method as recited in claim 18 wherein the particular state machine includes a timer, the method further including deleting the particular state machine if the timer expires.

21. A method as recited in claim 18 wherein the particular state machine correlates at least one event and at least one data element.

22. A method as recited in claim 18 wherein the particular state machine correlates a plurality of events and a plurality of data elements.

23. A method as recited in claim 18 further including determining a current state of the particular state machine.

24. One or more computer storage media containing a computer program that is executed by a processor to perform the method recited in claim 18.

25. An apparatus comprising:
a processor;
a plurality of event consumers; and
an event correlator coupled to the plurality of event consumers, the event correlator executed via the processor to receive events from at least one event source and to receive data elements from at least one data source, the event correlator further to receive at least one correlation function configured to correlate events and data elements and to apply the received events and the received data elements to the correlation function, wherein the correlation function is implemented by a state machine in a first programming language using a schema which defines state classes and permits the use of a variety of different programming languages by developers and the state machine has an associated update consumer provided as a class object separate from the state machine that defines and invokes transition operations for the state machine in lieu of when the state machine is defined, the transition operations update the state of the state machine based on an subscribed event, and wherein the event correlator generates a specific event if the received events and the received data satisfy the correlation function including updating the state machine when the event to which the update consumer has subscribed occurs.

26. An apparatus as recited in claim 25 wherein the event correlator communicates the specific event to the plurality of event consumers.

27. An apparatus as recited in claim 25 wherein the event correlator communicates the specific event to event consumers that have requested to receive the specific event.

28. An apparatus as recited in claim 25 wherein the event correlator communicates the specific event to a plurality of filters, wherein each of the plurality of filters is associated with one of the plurality of event consumers.

29. An apparatus as recited in claim 25 wherein the event correlator continues to receive additional events and additional data elements and apply the additional events and the additional data elements to the correlation function.

30. One or more computer storage media having stored thereon a computer program executed by one or more processors, causing the one or more processors to:
receive a plurality of events;
identify a plurality of correlation functions configured to correlate the plurality of events, wherein each of the plurality of correlation functions is implemented as a state machine in a first programming language using a schema which defines state classes and permits the use of a variety of different programming languages by developers and has an associated update consumer provided separate from the state machine that defines transition operations in said first programming language for the state machine, in lieu of the when the state machine is defined, to update the state of the state machine based on an subscribed event;
apply the plurality of events to the plurality of correlation functions to determine whether any of the plurality of correlation functions are satisfied by the plurality of events, wherein the plurality of events are applied by causing update consumers associated with each event to update the state of the associated state machine by invoking the transition operations when the associated subscribed event occurs; and
generate a specific event if one of the plurality of correlation functions is satisfied by the plurality of events.

31. One or more computer storage media as recited in claim 30 wherein each state machine is a class object.

32. One or more computer storage media as recited in claim 31 further causing the one or more processors to identify a current state of the state machine.

33. One or more computer storage media as recited in claim 30 further causing the one or more processors to:
create a new instance of a state machine to implement a particular correlation function; and
define transitions for the new instance of the state machine by subscribing to at least one event.

34. A computer-implemented method comprising:
receiving events from event providers;
creating a first state machine in a first programming language using a schema which defines state classes and permits the use of a variety of different programming languages by developers;
creating a second state machine in a second programming language using a schema which defines state classes and permits the use of a variety of different programming languages by developers;
associating a first event type with the first state machine, wherein the first state machine has an associated first update consumer separate from the first state machine that defines first transition operations in a first programming language for the first state machine in lieu when the first state machine is defined, wherein the first transition operations update the state of the first state machine based on an subscribed event;

associating a second event type with the second state machine, wherein the second state machine has an associated second update consumer, separate from the second state machine, that defines second transition operations in a second programming language for the second state machine in lieu of when the second state machine is defined, wherein the second transition objects update the state of the second state machine based on an subscribed event;

in response to receiving an event having a first event type, applying the first update consumer to the first state machine by invoking the first transition operations;

in response to receiving an event having a second event type, applying the second update consumer to the second state machine by invoking the second transition operations; and if the events are correlated:

generating an additional event; and sending the additional event to the event consumer.

35. The method as recited in claim 34, further comprising deleting the first state machine if the first state machine reaches a final state.

36. The method as recited in claim 34, wherein the additional event is sent to the event consumer through a filter associated with the event consumer.

37. The method as recited in claim 34, wherein the event consumer includes at least one of an event logging consumer, an event forwarding consumer, a mail consumer, and a scripting consumer.

* * * * *